UNITED STATES PATENT OFFICE.

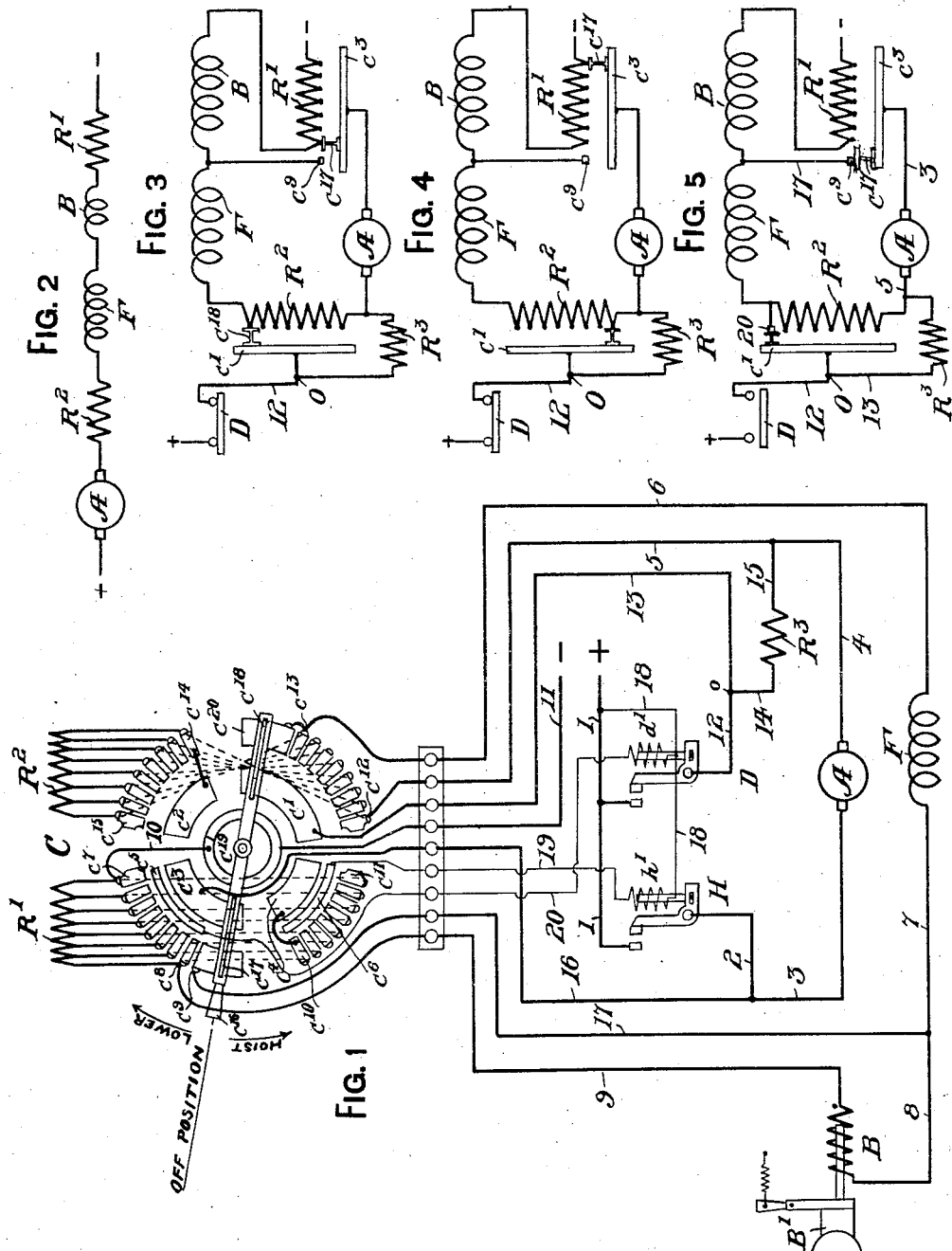

JAY H. HALL, OF CLEVELAND, OHIO, ASSIGNOR TO THE ELECTRIC CONTROLLER AND MANUFACTURING COMPANY, OF CLEVELAND, OHIO, A CORPORATION OF OHIO.

CONTROL SYSTEM FOR ELECTRIC MOTORS.

998,245.

Specification of Letters Patent.   Patented July 18, 1911.

Application filed March 18, 1910. Serial No. 550,146.

*To all whom it may concern:*

Be it known that I, JAY H. HALL, a citizen of the United States, residing at Cleveland, in the county of Cuyahoga and State of Ohio, have invented or discovered new and useful Improvements in Control Systems for Electric Motors, of which the following is a specification.

My invention relates to systems for controlling motors and has particular reference to the control of the motors used with hoists, but is not limited to such use.

It is the principal object of my invention to provide such circuits for the motor as will secure high maximum speeds for driving light loads down and to obtain a safe maximum speed for lowering such heavy loads as overhaul the motor and drive it as a generator.

It has been proposed to place a non-variable resistance in series with the armature branch of a motor circuit having the field in a parallel branch of the motor circuit, so that, when the master-controller is on the last lowering position, the said resistance would prevent the armature from attaining its highest speed when driving the load down and would allow the armature to run at a higher than normal speed on heavy loads when such load drives the motor as a generator.

It is the object of my invention to gradually short-circuit this resistance, or eliminate the effects of the same from the motor circuit as the controller is moved toward its full-on position in the lowering direction, until finally the armature terminals are connected directly across the supply mains.

Referring to the accompanying drawings, Figure 1 is a diagram illustrating the various conditions when the master controller is in the off-position; and Figs. 2, 3, 4, and 5 are simplified diagrams of the motor circuits when the master controller is, respectively, in the first hoisting position, the first lowering position, the final lowering position, and the off-position.

Fig. 1 shows conventionally the armature A, its series field F, the series winding B of the brake B', the magnetic switches D and H, the rheostatic resistances R' and R² controlled in an evident manner by the master-controller C, and the resistance R³ which I gradually short circuit as the master controller is moved in the lowering direction.

To hoist a load, the controller arm $c^{16}$ is placed in the first position hoisting, at which time the brushes $c^{17}$ and $c^{18}$ connect the segment $c^4$ to the contact $c^{10}$, and the segment $c^2$ to the contact $c^{14}$. A circuit is now established through the operating solenoid $h'$ of the switch H as follows: from the positive through the wire 18, the solenoid $h'$, the wire 19, the contact $c^6$, the brush $c^{17}$, the contact $c^{10}$, the cross connection to the contact $c^8$, the resistance R', the wire 10, the blow-out coil $c^{19}$, and the wire 11 to the negative. The current in this circuit causes the switch H to close, establishing the motor circuit as follows: from the positive through the wire 1, the switch H, the wires 2 and 3, the armature A from left to right, the wires 4 and 5, the contact $c^{12}$ the cross connection to the contact $c^{14}$, the resistance R², the contact $c^{15}$, the cross connection to the contact $c^{13}$, the wire 6, the series field F, the wires 7 and 8, the brake winding B, the wire 9, the contact $c^8$, the resistance R', the wire 10, the blow-out coil $c^{19}$, and the wire 11 to the negative. The motor is by this circuit connected across the line in series with the resistances R² and R', which circuit is shown in Fig. 2.

The variation of speed in hoisting is accomplished by means of plain rheostatic control. As the controller arm $c^{16}$ is moved toward the full-on position, the resistances R' and R² are gradually short-circuited until the full-on position is reached, at which time the motor is connected directly across the line.

It is understood that as soon as the current passes through the brake winding B the brake is released, which allows the motor to rotate; and since the winding B is at all times connected in series with the field of the motor when the motor circuit is connected to the source of supply, the brake will be held released. When it is desired to stop the load in hoisting, the controller arm is moved to the off-position, which operation gradually inserts the resistances R' and R² into the motor circuit, this circuit being finally broken at the off-position, when the brake winding B is deënergized and the brake permitted to set.

To operate the motor in a direction opposite to that in hoisting, the controller arm $c^{16}$ is moved to the first position on the lowering side of the controller, where the brush $c^{17}$ connects the contacts $c^3$, $c^5$, and $c^8$, and the brush $c^{18}$ connects the contacts $c'$ and $c^{13}$. A circuit is now established through the operating solenoid $d'$ of the switch D as follows: from the positive through the wire 18, the solenoid $d'$, the wire 20, the contact $c^5$, the brush $c^{17}$, the contact $c^8$, the resistance R', the wire 10, the blow-out coil $c^{19}$, and the wire 11 to the negative. The current in this circuit closes the switch D, the following motor circuit being established: from the positive through the wire 1, the switch D, and the wire 12 to the point O. Here the circuit divides, one branch being through the field F of the motor, and the other through the armature A, the field branch passing through the wire 13, the contact $c'$, the brush $c^{18}$, the contact $c^{13}$, the wire 6, the series field F in the same direction as in hoisting, the wires 7 and 8, the brake winding B, and the wire 9 to the contact $c^8$. Here the circuit just traced is joined by the branch circuit through the armature which latter circuit passes from the point O through the wire 14, the resistance $R^3$, the wires 15 and 4, the armature A from right to left, the wires 3 and 16, the contact $c^3$, the brush $c^{17}$, and the contact $c^8$, where the two branches of the circuit unite. The circuit is completed from the contact $c^8$ through the resistance R', the wire 10, the blow-out coil $c^{19}$, and the wire 11 to the negative. The simplified motor circuit just described is shown diagrammatically in Fig. 3.

The resistance $R^3$ is in parallel with resistance $R^2$, but since the resistance $R^3$ is a preventive resistance and much smaller than the resistance $R^2$, the greater portion of the current will pass through the resistance $R^3$. As the controller arm is moved toward the full-on position the result is to gradually insert the resistance $R^2$ in the field branch of the circuit, and at the same time to reduce the amount of the resistance $R^2$ which is in parallel with the resistance $R^3$ until, at the full-on position, all of the resistance $R^2$ is placed in the field circuit and the resistance $R^3$ is short-circuited. At the same time the resistance R' is cut out of the armature circuit and inserted in the dynamic braking circuit, so that, on the final full-on position, the armature is connected directly across the supply mains and the field is connected directly across the supply mains in series with the resistances $R^2$ and R'.

With the controller arm in the full-on position in the lowering direction, the armature circuit (Fig. 4) is as follows: from the positive through the switch D, the wires 12 and 13, the contact $c'$, the brush $c^{18}$, the contact $c^{12}$, the wires 5 and 4, the armature A, the wires 3 and 16, the contact $c^3$, the brush $c^{17}$, the contact $c^7$, the wire 10, the blow-out coil $c^{19}$, and the wire 11 to the negative. The circuit through the field is as follows: from the positive through the wire 1, the switch D, the wires 12 and 13, the contact $c'$, the brush $c^{18}$, the contact $c^{12}$, the cross connection to the contact $c^{14}$, the resistance $R^2$, the contact $c^{15}$, the cross connection to the contact $c^{13}$, the wire 6, the field F, the wires 7 and 8, the brake winding B, the wire 9, the contact $c^8$, the resistance R', the wire 10, the blow-out coil $c^{19}$, and the wire 11 to the negative. To reduce the speed in lowering, the controller arm $c^{16}$ is moved toward the off-position, which reverses the relation of the resistances to the motor circuit in the above description, the motor being slowed down by increasing the current through the series field by reducing the resistance therein, inserting resistances $R^3$ and R' in the armature circuit, reducing the resistance in the dynamic braking circuit, which is seen, by reference to Fig. 3, to contain the armature, the series field, and the brake winding B in series with the resistance $R^2$. If the controller arm $c^{16}$ is moved from the lowering to the off position, the connection to the brake is such that the brake coil is cut out of the dynamic braking circuit and the motor circuit is disconnected from the supply mains, as shown in the simplified circuit in Fig. 5, which allows the brake to set and assist the dynamic braking circuit to stop the load.

I do not limit my invention to series wound motors or brakes, nor to any definite type of controller, nor to other details and combinations thereof unless required by the prior art or by language in the claims which permits of no other construction.

I claim—

1. In an electric control system, a motor, two resistances for limiting the current in the armature circuit, the resistances having a common permanent connection with one terminal of the armature, and at least one of said resistances being variable, movable contacts coöperating with the variable resistance to cause the current in the said other resistance to decrease and the current in the part of the variable resistance adjacent to the said other resistance to increase.

2. In an electric control system, a motor, two resistances for limiting the current in the armature circuit, the resistances having a common permanent connection with one terminal of the armature, and at least one of said resistances being variable, and movable contacts for coöperating with the variable resistance, said contacts being so connected that at one position thereof the two resistances are in parallel, and as the contacts are moved toward the other limit of their travel, the amount of the variable resistance in parallel with the other resistance becomes smaller.

3. In an electric control system, a motor, a resistance connected between the armature and field windings, a second resistance connected in parallel with the first resistance, and means for causing an increase of voltage on the armature and a decrease of voltage on the field by reducing the amount of the first mentioned resistance in parallel with the second resistance.

4. In an electric control system, a motor, two resistances having a common connection, a motor armature having one terminal connected to the said common connection, and means for connecting the remaining end of one resistance to a source of supply and to various points on the other.

5. In an electric control system, a motor, means connecting the armature and field windings of the motor in parallel branches, a variable resistance in the field branch, a fixed resistance in parallel with the variable resistance, and means for decreasing the amount of the variable resistance in parallel with the fixed resistance.

6. In an electric control system, a motor, two resistances, means connecting the armature and field windings of the motor to the source of supply in parallel paths, low resistance in series with said paths, and means for increasing resistance in the parallel circuit, increasing the resistance between the field winding and the source of supply, and decreasing resistance between the armature and the source of supply.

7. In an electric control system, a motor, means connecting the armature and field windings of a motor in parallel branches, two resistances in parallel in the armature branch, and means for cutting portions of one resistance out of parallel with the other resistance and inserting said portions in the field branch.

8. In an electric control system, a motor, means connecting the armature and field windings in parallel branches to the supply mains, a resistance in series with said branches, a relatively small resistance in the branch circuit containing the armature, and means for increasing resistance in the field branch and decreasing resistance in the armature branch until the small resistance is short-circuited and the armature is connected directly across the supply mains.

9. In an electric control system, a motor, means connecting the armature and field windings in parallel paths, a fixed and a variable resistance in the armature path, and means by which the said fixed resistance is short-circuited to cause an increase of voltage on the armature and a decrease of voltage on the field winding.

10. In an electric control system, a motor, means connecting the armature and field of a motor in parallel branches across the supply mains, a fixed and a variable resistance in circuit therewith, and means by which the variable resistance is cut out of the armature branch and inserted in the field branch and the fixed resistance is short-circuited.

11. In an electric control system, a motor, two resistances, one resistance having one terminal connected to the field and the other terminal connected to the armature and to one terminal of the second resistance, and means connecting the other terminal of the second resistance to various points on the first resistance.

12. In an electric control system, a motor, a resistance connected between the armature and the field of a motor, a second resistance having one end connected to the source of supply, and the other end to one terminal of the first resistance, and means connecting the source of supply to various points on the first resistance.

13. In an electric control system, a motor, means connecting the armature and the field windings of the motor in parallel branches, a fixed resistance in one branch and variable resistance in parallel with the fixed resistance, and means for transferring the variable resistance to the other branch.

14. In an electric control system, a motor, means for connecting the armature and the field of the motor in parallel branches, a resistance in one branch, a variable resistance in parallel therewith, and means for gradually transferring the variable resistance to the other branch and for short-circuiting the other resistance.

15. In an electric control system, a motor, means for connecting the armature and the field windings of the motor in parallel branches, two resistances in parallel in the armature branch, means for gradually and simultaneously transferring one of the resistances to the field branch and for short-circuiting the other resistance.

16. In an electric control system, a motor, resistance connected between the armature and the field windings, means for connecting the armature and the field in series across a source of supply to operate the motor in one direction, and means for connecting a second resistance in parallel with the first resistance to operate the motor in the reverse direction and for reducing the amount of the first mentioned resistance in parallel with the second resistance to vary the speed of the motor.

17. In an electric control system, a motor, a variable resistance connected between the armature and the field windings, means for connecting the armature, the field, and the resistance in series to operate the motor in one direction, means for connecting the armature and field windings in parallel branches, the resistance being in one branch and in parallel with the second resistance to operate the motor in the reverse direction, and means for short-circuiting the second resistance.

18. In an electric control system, a motor, a variable resistance connected between the armature and the field of a motor, a fixed resistance having one terminal connected to a point between the variable resistance and the armature, and means connecting the other terminal to a source of supply and to various points on the variable resistance.

Signed at Cleveland, Ohio, this 2nd day of March, 1910.

JAY H. HALL.

Witnesses:
 HENRY L. ASSET,
 W. M. DIEMER.